US008586676B2

(12) United States Patent
Van Loon et al.

(10) Patent No.: US 8,586,676 B2
(45) Date of Patent: Nov. 19, 2013

(54) POLYMER COMPOSITIONS AND ARTICLES MADE THEREFROM

(75) Inventors: Achiel J. Van Loon, Schoten (BE); Zhi Y. Shen, Shanghai (CN)

(73) Assignee: ExxonMobil Chemical Patents Inc., Houston, TX (US)

(*) Notice: Subject to any disclaimer, the term of this patent is extended or adjusted under 35 U.S.C. 154(b) by 0 days.

(21) Appl. No.: 13/582,838

(22) PCT Filed: Mar. 9, 2010

(86) PCT No.: PCT/CN2010/000287

§ 371 (c)(1), (2), (4) Date: Oct. 15, 2012

(87) PCT Pub. No.: WO2011/109920

PCT Pub. Date: Sep. 15, 2011

(65) Prior Publication Data

US 2013/0065035 A1 Mar. 14, 2013

(51) Int. Cl.

*C08F 8/00* (2006.01)
*C08L 33/04* (2006.01)
*C08L 33/10* (2006.01)

(52) U.S. Cl.

USPC .......... 525/191; 525/240

(58) Field of Classification Search

USPC .......... 525/191, 240

See application file for complete search history.

(56) References Cited

U.S. PATENT DOCUMENTS

| | | | | |
|---|---|---|---|---|
| 4,460,750 | A | 7/1984 | Theirsault et al. | |
| 5,844,045 | A | 12/1998 | Kolthammer | |
| 6,111,023 | A | 8/2000 | Chum | |
| 6,306,969 | B1 * | 10/2001 | Patel et al. | 525/191 |
| 6,870,010 | B1 | 3/2005 | Lue et al. | |
| 2012/0164421 | A1 * | 6/2012 | Shen et al. | 428/218 |

OTHER PUBLICATIONS

C.A. Garcia-Franco, et al, "Relative quantification of long chain branching in essentially linear polymers", European Polymer Journal, vol. 44, pp. 376-391, Nov. 17, 2007 (on-line).

* cited by examiner

*Primary Examiner* — Nathan M Nutter

(74) *Attorney, Agent, or Firm* — Leandro Arechederra, III

(57) ABSTRACT

A polymer composition and articles made therefrom are provided. The composition includes: (a) Component A having (i) at least 50 wt % ethylene moieties; and (ii) up to 50 wt % of a $C_3$ to $C_{20}$ comonomer moieties, a density of about 0.860 to about 0.965 g/cm$^3$, a melt index of about 0.1 to about 10.0 g/10 min and a branching index of about 0.96 to about 1.0; and (b) Component B having: (i) at least 65 wt % ethylene moieties; and (ii) up to 35 wt % of a $C_3$ to $C_{20}$ comonomer moieties, the wt % s based upon total the total weight of Component B, a density of about 0.905 to about 0.945 g/cm$^3$, a melt index (MI) of about 0.1 to about 10.0 g/10 min, and a branching index (g') of about 0.7 to about 0.95. Films made using the polymer composition exhibit excellent toughness and processability.

19 Claims, 2 Drawing Sheets

POLYMER COMPOSITIONS AND ARTICLES MADE THEREFROM

PRIORITY CLAIM

This application is a National Stage Application of International Application No. PCT/CN2010/000287, filed Mar. 9, 2010, which is hereby incorporated by reference in its entirety.

FIELD OF THE INVENTION

The present invention relates to polymer compositions. More particularly, the invention relates to polymer compositions comprising a blend of linear low density polyethylenes.

BACKGROUND OF THE INVENTION

Blends of linear low density polyethylene (LLDPE), which can be prepared by either Ziegler-Natta catalyst or metallocene catalyst, and low density polyethylene (LDPE) are commonly used to form articles such as films, sheets, coatings, and laminates. The LLDPE provides good toughness (e.g., tear strength, dart impact and puncture resistance) and hot tack force, and the LDPE provides good processability (e.g., melt temperature, melt pressure and motor load). However, the LDPE can also disadvantageously cause a significant loss of toughness and hot tack force.

That said, what is needed in the art is polymer compositions suitable for use in films, sheets, coatings, and laminates that provide improved toughness and hot tack force without compromising processability.

SUMMARY OF THE INVENTION

In one aspect, this disclosure relates to films comprising: (a) component A having at least about 50 wt % of ethylene moieties, up to about 50 wt % of $C_3$ to $C_{20}$ comonomer moities, a density of about 0.860 to about 0.965 g/cm$^3$, a melt index of about 0.1 to about 1.0 g/10 min and a branching index of about 0.96 to about 1; and (b) component B having: at least 65 wt % ethylene moieties, up to 35 wt % of a $C_3$ to $C_{20}$ comonomer moities, a density of about 0.905 to about 0.945 g/cm$^3$, a melt index of about 0.1 to about 10.0 g/10 min, and a branching index (g') of about 0.7 to about 0.95. Films made using the polymer composition exhibit excellent toughness and processability. In various embodiments, the compositions described herein are used to form articles such as films, sheets, coatings, and laminates.

In another aspect, this disclosure relates to films comprising a blend of about 75 wt % of component A and about 25 wt % of component B and thickness is greater than about 20 nm and one or more of: (a) an Elmendorf Tear of greater than about 20 g in the machine direction; and (b) a dart impact of greater than about 50 g/μm; and (c) a puncture force at break of greater than about 30N; and (d) a hot tack peak force of greater than 5 N/30 mm.

These and other features, aspects, and advantages of the present disclosure will become better understood with regard to the following description and appended claims.

DETAILED DESCRIPTION OF THE INVENTION

Figure 1:
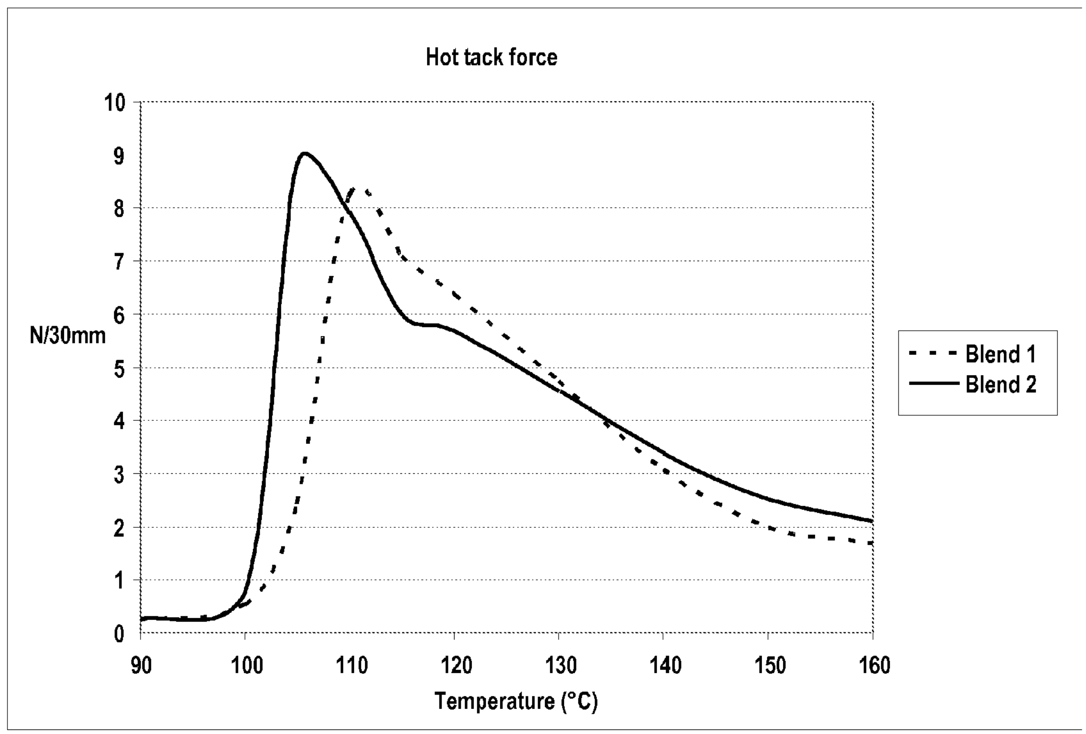
FIGS. 1 and 2 provide an illustrative comparison of the hot tack properties of films formed using conventional blends and the novel blend described herein.

Various specific embodiments, versions and examples of the invention will now be described, including preferred embodiments and definitions that are adopted herein for purposes of understanding the claimed invention. While the following detailed description gives specific embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

That said, polymer compositions comprising a blend of a first component (Component A) and a second component (Component B) are described herein. These compositions may be used to form articles such as films, sheets, coatings, and laminates having excellent toughness and sealing without compromising processability.

Component A

In accordance with various exemplary embodiments, the compositions described herein comprise from about 1 to about 99 wt % of Component A, or about 20 to about 90 wt % of Component A, or about 50 to about 85 wt %, or about 70 to about 80 wt %, or about 75 wt %, based upon total weight of the composition. Ranges from any lower limit to any upper limit are contemplated. In one embodiment, Component A comprises a LLDPE.

In various embodiments, Component A comprises at least about 1 wt % ethylene moieties, or at least about 20 wt % ethylene moieties, or at least about 40 wt % ethylene moieties, or at least about 50 wt % of ethylene moieties, or at least about 60 wt % of ethylene moieties. The wt % s are based upon total weight of the copolymer.

In various embodiments, Component A is copolymer. As used herein, the term "copolymer" includes polymers having more than two types of monomers, such as terpolymers. Component A may have up to about 99 wt % comonomer moieties, or up to about 90 wt % of comonomer moieties, or up to about 70 wt % of comonomer moieties, or up to about 50 wt % of comonomer moieties, or about 1 to about 35 wt % of comonomer moieties, or about 1 to about 20 wt % of comonomer moieties, the wt % based upon total weight of Component A.

In various embodiments, the comonomer comprises one or more α-olefins. Suitable α-olefins include, for example, $C_3$-$C_{20}$ α-olefins, or $C_3$-$C_{10}$ α-olefins, or $C_3$-$C_8$ α-olefins. The α-olefin comonomer may be linear or branched, and two or more comonomers may be used, if desired. Examples of suitable α-olefin comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Specifically, but without limitation, the combinations of ethylene with a comonomer may include: ethylene propylene, ethylene butene, ethylene 1-pentene; ethylene 4-methyl-1-pentene; ethylene 1-hexene; ethylene 1-octene; ethylene decene; ethylene dodecene; ethylene 1-hexene 1-pentene; ethylene 1-hexene 4-methyl-1-pentene; ethylene 1-hexene 1-octene; ethylene 1-hexene decene; ethylene 1-hexene dodecene; ethylene 1-octene 1-pentene; ethylene 1-octene 4-methyl-1-pentene; ethylene 1-octene 1-hexene; ethylene 1-octene decene; ethylene 1-octene dodecene; combinations thereof and like permutations. In one embodiment, the comonomer comprises one or more of vinyl acetate (VA), acrylic acid (AA), or methyl methacrylate (MA).

In various embodiments, Component A may have one or more of the following properties:

(a) a density (sample prepared according to ASTM D-4703, and the measurement according to ASTM D-1505) of about 0.860 to about 0.965 g/cm$^3$, or about 0.905 to 0.940 g/cm$^3$, or about 0.912 to about 0.935 g/cm$^3$;

(b) a Melt Index ("MI", ASTM D-1238, 2.16 kg, 190° C.) of about 0.1 to about 10.0 g/10 min, or about or about 0.5 to about 5 g/10 min, or about 1 to about 3.0 g/10 min;

(c) a Melt Index Ratio ("MIR", $I_{21.6}$(190° C., 21.6 kg)/$I_{21.6}$ (190° C., 2.16 kg)) of about 1 to about 40, or about 10 to about 30, or about 15 to about 20, or about 16 to about 18. In an exemplary embodiment, component A has a lower MIR than component B;

(d) a Composition Distribution Breadth Index ("CDBI") of up to about 85%, or up to about 75%, or about 5 to about 85%, or 10 to 75%. The CDBI may be determined using techniques for isolating individual fractions of a sample of the resin. The preferred technique is Temperature Rising Elution Fraction ("TREF"), as described in Wild, et al., *J. Poly. Sci., Poly. Phys. Ed*., Vol. 20, p. 441 (1982), which is incorporated herein for purposes of U.S. practice; and/or (e) a branching index of about 0.9 to about 1.0, or about 0.96 to about 1.0, or about 0.97 to about 1.0. Branching Index is an indication of the amount of branching of the polymer and is defined as $g'=[Rg]^2_{br}/[Rg]^2_{lin}$. "Rg" stands for Radius of Gyration, and is measured using a Waters 150 gel permeation chromatograph equipped with a Multi-Angle Laser Light Scattering ("MALLS") detector, a viscosity detector and a differential refractive index detector. "$[Rg]_{br}$" is the Radius of Gyration for the branched polymer sample and "$[Rg]_{lin}$" is the Radius of Gyration for a linear polymer sample. It is well known in the art that as the g' value decreases, long-chain branching increases. By way of reference, low density polyethylene (LDPE) typically has a g' of about 0.2 to about 0.5, or about 0.3 to about 0.4. Moreover, Table 1 provides exemplary g' values of various commercially available LDPE and LLDPEs.

Component A is not limited by any particular method of preparation and may be formed using any process known in the art. For example, Component A may be formed using gas phase, solution, or slurry processes.

In one embodiment, Component A is formed in the presence of a Ziegler-Natta catalyst, such as those based upon titanium compounds (e.g., $TiCl_4$) and organometallic aluminium compounds. Useful Ziegler-Natta catalyzed polymers include those commercially available from ExxonMobil Chemical Company in Houston, Tex., such as those sold under the trade designation ExxonMobil™ LLDPE.

In another embodiment, Component A is formed in the presence of a single-site catalyst, such as a metallocene catalyst. For example, Component A may be a metallocene polyethylene (m-PE) produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. m-PEs useful as Component A include those commercially available from ExxonMobil Chemical Company in Houston, Tex., such as those sold under the trade designation EXCEED™ and EXACT™.

Component B

In accordance with various exemplary embodiments, the compositions described herein comprise from about 99 to about 1 wt % of Component B, or about 10 to about 80 wt %, or about 15 to about 50 wt %, or about 10 to about 30 wt %, or about 25 wt %, based upon total weight of the composition. Ranges from any lower limit to any upper limit are contemplated.

Component B may comprise at least 1 wt % ethylene moieties, or at least 30 wt % ethylene moieties, or at least 50 wt % of ethylene moieties, or at least 65 wt % ethylene moieties, or at least 75 wt % ethylene moieties. The wt % s based upon total weight of the copolymer. In one embodiment, Component B is a LLDPE.

In various embodiments, Component B is a copolymer comprising up to about 99 wt % comonomer moieties, or up to about 50 wt % of comonomer moieties, or up to about 70 wt % of comonomer moieties, about 1 to about 35 wt % comonomer moieties, or about 1 to about 20 wt % of comonomer moieties, or about 1 to about 10 wt % comonomer moities (the comonomer being any of those described herein) and the wt % s based upon total weight of Component B.

In various embodiments, Component B may have one or more of the following properties:

(a) a density (sample prepared according to ASTM D-4703, and the measurement according to ASTM D-1505) of about 0.905 to about 0.945 g/cm$^3$, or about 0.915 to about 0.940 g/cm$^3$;

(b) a Melt Index ("MI", ASTM D-1238, 2.16 kg, 190° C.) of about 0.1 to about 10.0 g/10 min, or 0.5 to about 5.0 g/10 min, or about 1 to about 3.0 g/10 min;

(c) a Melt Strength of greater than about 2.0 cN, or greater than about 4.0 cN. Melt Strength was determined using the Rheotens 71-97 in combination with the Rheograph 2002 as described: (1) Rheograph 2002 has: temperatures of 190° C. and 230° C., die: 30/2, piston speed: 0.178 mm/s, shear rate: 40.050 sec−1, wheels: grooved; (2) Strand: length: 100 mm, $V_0$: 10 mm/s; and (3) Rheotens: gap: 0.7 mm, acceleration: 12.0 mm/s$^2$ For each material, several measurements were performed. The complete amount of material present in the barrel of the Rheograph is extruded through the die and is being picked up by the rolls of the Rheotens. Once the strand is placed between the rolls, the roll speed is adjusted till a force 0 is measured once the strand touches the ground. This beginning speed Vs is the speed of the strand through the nip of the wheels at the start of the test. Once the test is started, the speed of the rolls is increased with a 12.0 mm/s$^2$ acceleration and the force is measured for each given speed. After each strand break, or strand slip between the rotors, the measurement is stopped and the material is placed back between the rolls for a new measurement, which is started when the strand again touches the ground. A new curve is recorded. Measuring continues until all material in the barrel is used. After testing, all the obtained curves are saved. Curves, which are out of line, are deactivated. The remaining curves, are cut at the same point at break or slip (maximum force measured), and are used for the calculation of a mean curve. The numerical data of this calculated mean curves are reported;

(d) a relation between Melt Index in g/10 min and Melt Strength in cN according to the formula:

$$MS=-2.6204*MI+7.5686;$$

(e) a Melt Index Ratio ("MIR", $I_{21.6}$(190° C., 21.6 kg)/$I_{2.16}$ (190° C., 2.16 kg)) of about 20 to about 100, or about 25 to about 95, or greater than 30 to about 90, or greater than about 35 to about 80. In one embodiment, the MIR can be determined according to the following formula:

$$\ln(MIR)=-18.20-0.2634\ \ln(MI,I_{2.16})+23.58\times[\text{density, g/cm}^3];$$

(f) a Composition Distribution Breadth Index ("CDBI", determined according to the procedure disclosed herein) of greater than about 50%, or greater than about 60%, or greater than 75%, or greater than 85%;

(g) a molecular weight distribution ("MWD") of about 2.0 to about 5.5; MWD is measured using a gel permeation chromatograph ("GPC") equipped with a differential refractive index ("DRI") detector; and/or (h) a branching index ("g'"), (determined according to the procedure described herein) of about 0.5 to about 0.97, or about 0.7 to about 0.95.

Component B is not limited by any particular method of preparation and may be formed using any process known in the art. For example, Component B may be formed using gas phase, solution, or slurry processes.

In one embodiment, Component B is formed in the presence of a Ziegler-Natta catalyst. In another embodiment, Component B is formed in the presence of a single-site catalyst, such as a metallocene catalyst (such as any of those described herein). Polymers useful as Component B in this invention include those disclosed in U.S. Pat. No. 6,255,426, entitled "Easy Processing Linear Low Density Polyethylene" (Lue), which is hereby incorporated by reference for this purpose, and include those commercially available from ExxonMobil Chemical Company in Houston, Tex., such as those sold under the trade designation ENABLE™.

Additional Components

In various embodiments, one or more additional polymers and/or additives may be included in the composition, in one or more components of the composition, and/or in an article formed from the composition, such as a films, sheets, coatings, or laminates.

Additional polymers include, for example, one or more: additional LLDPEs, LDPEs, high density polyethylenes (HDPEs), copolymers of vinyl acetate, methyl acetate, butyl acetate, acrylic acids, and/or ionomers, and terpolymers (such as those commercially available from ExxonMobil Chemical Company in Houston, Tex. under the trade designation Exact™ plastomer, Escorene™ Ultra ethylene vinyl acetate (EVA), Optema™ ethylene methyl acrylate (EMA), ExxonMobil™ ethylene n-butyl acrylate (EnBA), Escor™ ethylene acrylic acid (EAA), and Iotek™ ionomer), polypropylene and propylene-based elastomers (such as those commercially available from ExxonMobil Chemical Company in Houston, Tex. under the trade designation Vistamaxx™)

Additives include, for example, fillers, primary and secondary antioxidants (e.g., hindered phenolics such as IRGANOX™ 1010 or IRGANOX™ 1076 commercially available from Ciba-Geigy), anti-cling additives, ultraviolet stabilizers, heat stabilizers, plasticizers, anti-blocking agents, release agents, anti-static agents, pigments, colorants, dyes, waxes, silica, fillers, talc, processing aids, and the like.

Articles

The polymer compositions described herein may be used to form a variety of articles. For example, the compositions can be used to make films, sheets, coatings, and/or laminates. The laminates may be used in combination with a variety of substrates (e.g., paper, board, fabric, aluminum foil, polypropylene films, polyethylene terephthlate (PET) films, polyacetylene (PA) films). Such articles may be produced by any method known or hereinafter devised, e.g., extrusion, coextrusion, and lamination processes.

Formation

The compositions and articles described herein are not limited by any particular method of preparation, and may be formed using conventional or hereinafter devised equipment and methods.

In one embodiment, the composition is in-line blended in a film extruder. The composition may be subjected to single layer extrusion or multi-layer extrusion on a distinct layer or in several layers with the same or different blending ratios or polymer types. Film extrusion can be a blown film process or cast film process and may be conducted without additional mixing or hot blending. Additionally, the individual components may be dry compositioned and subsequently melt-mixing in a mixer, or by mixing the components directly together in a mixer (e.g., a Banbury mixer, a Haake mixer, a Brabender mixer, and/or dry mixer), or a single or twin-screw extruder, which may include a compounding extruder and/or a side-arm extruder used directly downstream of a polymerization process or on-line blending at the converter operation.

The films may be single layer or multilayer. The blending ratios of Component A to Component B in one or more layers may be the same or different.

Film Properties

In accordance with various embodiments, the films formed using the polymer compositions disclosed herein may be any thickness according to the desired properties of the film. For example, the film thickness may be about 1 to about 1000 μm.

In various embodiments, a film having a thickness of about 20 nm or greater comprising a blend of Component A and Component B having a blend ratio of 75:25 (in wt %) and one or more of the following properties (determined by the procedures described herein):

(a) an Elmendorf Tear of greater than about 10 g, or greater than about 20 g in the machine direction;

(b) a dart impact of greater than about 30 g/μm, or greater than about 50 g/μm;

(c) a puncture force at break of greater than about 15N, or greater than about 30N; and (d) a hot tack peak force of greater than about 2N/30 mm, or greater than about 5N/30 mm.

EXAMPLES

The advantages of the films described herein will now be further illustrated with reference to the following non-limiting examples.

Properties and Materials

The properties used in the claims and the Examples are determined as follows:

Melt Index (MI) and Melt Flow Rate (MFR) were determined per ASTM D-1238;

Density was determined per ASTM D-47-03 and ASTM1505;

Elmendorf Tear was determined per ASTM D-1922;

Dart Impact Strength was determined per ASTM D-1709;

Puncture Force at Break was determined per ASTM D-3763;

Hot Tack Peak Force was determines per ASTM F-1921; and

Melt Temperature and Melt Pressure were measured after screen pack.

Table 1 provides a listing of materials used in the films of Examples.

TABLE 1

| Resins Used in Examples | | |
|---|---|---|
| Component | Brief Description | Commercial Source |
| ExxonMobil ™ LL 1001XV | Ethylene-butene copolymer, MI = 1.0 g/10 min, density = 0.918 g/cm$^3$, Ziegler-Natta-catalyzed, UNIPOL ™ process | ExxonMobil Chemical Company |
| ExxonMobil ™ LD 150BW | MI = 0.75 g/10 min, density = 0.923 g/cm$^3$, LDPE, High Pressure Tubular process | ExxonMobil Chemical Company |
| EXCEED ™ 1018 CA (m-PE) | Ethylene-hexene copolymer, MI = 1.0 g/10 min, density = 0.918 g/cm$^3$, metallocene-catalyzed, UNIPOL ™ process | ExxonMobil Chemical Company |
| EXCEED ™ 2018 CA (m-PE) | Ethylene-hexene copolymer, MI = 2.0 g/10 min, density = 0.918 g/cm$^3$, metallocene-catalyzed, UNIPOL ™ process | ExxonMobil Chemical Company |
| ENABLE ™ 20-10CH (m-PE) | Ethylene-hexene copolymer, MI = 1.0 g/10 min, density = 0.920 g/cm$^3$, metallocene-catalyzed, UNIPOL ™ process | ExxonMobil Chemical Company |
| ENABLE ™ 20-05CH (m-PE) | Ethylene-hexene copolymer, MI = 0.5 g/10 min, density = 0.920 g/cm$^3$, metallocene-catalyzed, UNIPOL ™ process | ExxonMobil Chemical Company |
| ENABLE ™ 23-05CH (m-PE) | Ethylene-hexene copolymer, MI = 0.5 g/10 min, density = 0.923 g/cm$^3$, metallocene-catalyzed, UNIPOL ™ process | ExxonMobil Chemical Company |
| ENABLE ™ 27-05CH (m-PE) | Ethylene-hexene copolymer, MI = 0.5 g/10 min, density = 0.927 g/cm$^3$, metallocene-catalyzed, UNIPOL ™ process | ExxonMobil Chemical Company |
| ENABLE ™ 35-05CH (m-PE) | Ethylene-hexene copolymer, MI = 0.5 g/10 min, density = 0.935 g/cm$^3$, metallocene-catalyzed, UNIPOL ™ process | ExxonMobil Chemical Company |
| ExxonMobil ™ HTA108 | Ethylene homopolymer, MI = 0.7 g/10 min, density = 0.961 g/cm$^3$, Ziegler-Natta-catalyzed, UNIPOL ™ process | ExxonMobil Chemical Company |
| Z-N C8LLDPE | Ethylene-octene copolymer, MI = 1.0 g/10 min, density = 0.920 g/cm$^3$, Ziegler-Natta-catalyzed, solution process | Supplier 1 |

As used herein, "UNIPOL™ process" refers to a polymerization process owned Univation Technologies, a joint venture between ExxonMobil Chemical Company and Dow Chemical Company for manufacturing olefin-based polymers such as polyethylene (PE).

The films of Examples 1-3 were made on an Alpine™ mono-layer blown film line with screw size: 75 mm, screw length: 25/1 L/D, die diameter: 200 mm, die gap: 1.5 mm, Blow Up Ratio (BUR): 2.5, throughput: 120 kg/hr.

The wt % ratios of Examples 1-5 are based upon total weight of the compositions.

Example 1

Tables 3-5 illustrate various properties of single-layer films formed using: (1) conventional LLDPE/LDPE blends; and (2) inventive blends of Component A and Component B. As shown, the inventive blends provide a combination of better Elmendorf Tear, Dart Impact, Puncture and comparable processability. The film extrusion machine temperature settings are shown in Table 2. The length of each Zone is equal to the length of the component (barrel, adaptor, and die) divided by the number of zones in the component.

TABLE 2

| | Zone | ° C. |
|---|---|---|
| Barrel | 1 | 180 |
| | 2 | 180 |
| | 3 | 185 |
| | 4 | 190 |
| Adaptor | 6 | 190 |
| | 7 | 190 |
| Die | 8 | 190 |
| | 9 | 190 |
| | 10 | 190 |
| | 11 | 200 |
| | 12 | 200 |

TABLE 3

| Thin Gauge Film | | | | |
|---|---|---|---|---|
| | Blend 1 | Blend 2 | Blend 3 | Blend 4 |
| Film Thickness (μm) | 25 | 20 | 20 | 20 |
| Elmendorf Tear (g, MD/TD) | 20/ 407.5 | 28/ 546 | 34/ 498 | 38/ 590 |
| Dart Impact (g/μm) | 69 | 82 | 130 | 82 |
| Puncture (N) | 67.5 | 70 | 78 | 66 |
| Melt Temperature (° C.) | 225 | 223 | 219 | 215 |
| Melt Pressure (Bar) | 494 | 530 | 540 | 530 |
| Motor Load (A) | 118 | 130 | 137 | 135 |

Legend for Table 3
Blend 1 LL1001XV/LD150BW blend (75:25 wt % ratio)
Blend 2 LL1001XV/ENABLE ™ 23-05CH blend (75:25 wt % ratio)
Blend 3 LL1001XV/ENABLE ™ 23-05CH blend (25:75 wt % ratio)
Blend 4 LL1001XV/ENABLE ™ 27-05CH blend (50:50 wt % ratio)

TABLE 4

| Medium Gauge Film | | |
|---|---|---|
| | Blend 1 | Blend 2 |
| Film Thickness (μm) | 50 | 40 |
| Elmendorf Tear (g, MD/TD) | 55/585 | 104/856 |
| Dart Impact (g/μm) | 189 | 216 |
| Puncture (N) | 110 | 120 |
| Melt Temperature (° C.) | 225 | 212 |
| Melt Pressure (Bar) | 494 | 525 |
| Motor Load (A) | 118 | 136 |

Legend for Table 4

Blend 1 LL1001XV ™/LD150BW ™ blend (75:25 wt % ratio)

Blend 2 LL1001XV ™/ENABLE ™ 27-05CH blend (25:75 wt % ratio)

TABLE 5

| Thick Gauge Film | | | | |
|---|---|---|---|---|
| | Blend 1 | Blend 2 | Blend 3 | Blend 4 |
| Film Thickness (μm) | 100 | 80 | 80 | 80 |
| Elmendorf Tear (g, MD/TD) | 290/960 | 480/1176 | 376/1176 | 464/1048 |
| Dart Impact (g/μm) | 384 | 496 | 384 | 360 |
| Puncture (N) | 190 | 216 | 192 | 192 |
| Melt Temperature (° C.) | 225 | 223 | 215 | 224 |
| Melt Pressure (Bar) | 496 | 517 | 530 | 519 |
| Motor Load (A) | 119 | 131 | 135 | 129 |

Legend for Table 5
Blend 1 LL1001XV ™/LD150BW ™ blend (75:25 wt % ratio)
Blend 2 LL1001XV ™/ENABLE ™ 20-05CH blend (50:50 wt % ratio)
Blend 3 LL1001XV ™/ENABLE ™ 27-05CH blend (50:50 wt % ratio)
Blend 4 LL1001XV ™/ENABLE ™ 23-05CH blend (75:25 wt % ratio)

Example 2

Tables 7-9 illustrate various properties of single-layer films formed using: (1) conventional LLDPE/LDPE blends; and (2) blends of Component A and Component B. As shown, the inventive blends provide a combination of better Elmendorf Tear, Dart Impact, Puncture, and excellent processability. The film extrusion machine temperature settings are shown in Table 6. The length of each Zone is equal to the length of the component (barrel, adaptor, and die) divided by the number of zones in the component.

TABLE 6

| | Zone | ° C. |
|---|---|---|
| Barrel | 1 | 180 |
| | 2 | 180 |
| | 3 | 180 |
| | 4 | 185 |
| Adaptor | 6 | 185 |
| | 7 | 185 |
| | 8 | 185 |
| | 9 | 190 |
| Die | 10 | 190 |
| | 11 | 190 |
| | 12 | 190 |

TABLE 7

| Thin Gauge Film | | | | | |
|---|---|---|---|---|---|
| | Blend 1 | Blend 2 | Blend 3 | Blend 4 | Blend 5 |
| Film Thickness (μm) | 25 | 20 | 20 | 20 | 20 |
| Elmendorf Tear (g, MD/TD) | 32.5/555 | 58/386 | 62/482 | 114/500 | 82/494 |
| Dart Impact (g/μm) | 196 | 696 | 218 | 265 | 142 |
| Puncture (N) | 37.5 | 104 | 86 | 94 | 74 |
| Melt Temperature (° C.) | 236 | 238 | 223 | 233 | 214 |
| Melt Pressure (Bar) | 605 | 571 | 576 | 590 | 603 |
| Motor Load (A) | 142 | 144 | 145 | 148 | 150 |

Legend for Table 7
Blend 1 EXCEED ™ 1018CA/LD150BW blend (75:25 wt % ratio)
Blend 2 EXCEED ™ 1018CA/ENABLE ™ 23-05CH blend (75:25 wt % ratio)
Blend 3 EXCEED ™ 1018CA/ENABLE ™ 23-05CH blend (25:75 wt % ratio)
Blend 4 EXCEED ™ 1018CA/ENABLE ™ 27-05CH blend (75:25 wt % ratio)
Blend 5 EXCEED ™ 1018CA/ENABLE ™ 27-05CH blend (25:75 wt % ratio)

TABLE 8

| Medium Gauge Film | | | | |
|---|---|---|---|---|
| | Blend 1 | Blend 2 | Blend 3 | Blend 4 |
| Film Thickness (μm) | 50 | 40 | 40 | 40 |
| Elmendorf Tear (g, MD/TD) | 235/1685 | 308/732 | 332/732 | 312/820 |
| Dart Impact (g/μm) | 360 | 1282 | 1005 | 764 |
| Puncture (N) | 190 | 176 | 160 | 168 |
| Melt Temperature (° C.) | 231 | 235 | 238 | 233 |
| Melt Pressure (Bar) | 656 | 585 | 569 | 587 |
| Motor Load (A) | 144 | 145 | 143 | 147 |

Legend for Table 8
Blend 1 EXCEED ™ 1018CA/LD150BW ™ blend (75:25 wt % ratio)
Blend 2 EXCEED ™ 1018CA/ENABLE ™ 20-05CH blend (75:25 wt % ratio)
Blend 3 EXCEED ™ 1018CA/ENABLE ™ 23-05CH blend (75:25 wt % ratio)
Blend 4 EXCEED ™ 1018CA/ENABLE ™ 27-05CH blend (75:25 wt % ratio)

TABLE 9

| Thick Gauge Film | | | |
|---|---|---|---|
| | Blend 1 | Blend 2 | Blend 3 |
| Film Thickness (μm) | 100 | 80 | 80 |
| Elmendorf Tear (g, MD/TD) | 680/3120 | 688/1368 | 752/1400 |
| Dart Impact (g/μm) | 773 | 1823 | 1631 |
| Puncture (N) | 330 | 304 | 280 |
| Melt Temperature (° C.) | 236 | 236 | 238 |
| Melt Pressure (Bar) | 607 | 607 | 574 |
| Motor Load (A) | 142 | 150 | 143 |

Legend for Table 9
Blend 1 EXCEED ™ 1018CA/LD150BW ™ blend (75:25 wt % ratio)
Blend 2 EXCEED ™ 1018CA/ENABLE ™ 20-05CH blend (75:25 wt % ratio)
Blend 3 EXCEED ™ 1018CA/ENABLE ™ 23-05CH blend (75:25 wt % ratio)

Example 3

Tables 11-13 illustrate various properties of single-layer films formed using: (1) conventional LLDPE/LDPE blends; and (2) blends of Component A and Component B. As shown, the inventive blends provide a combination of better Elmendorf Tear, Dart Impact, and similar excellent processability.

Figure 2:
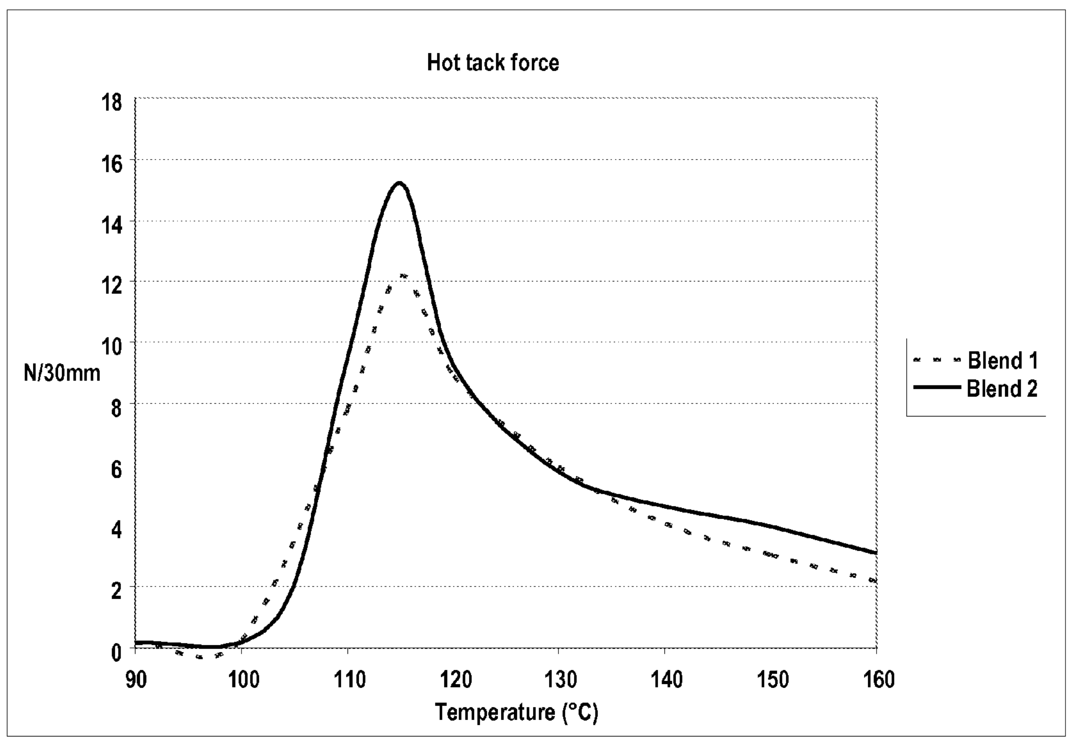

FIGS. 1 and 2 illustrate hot tack peak force of single layer films formed using: (1) conventional LLDPE/LDPE blends; and (2) blends of Component A and Component B. Blend 1 of FIGS. 1 and 2 illustrate conventional LLDPE/LDPE blends. Blend 2 illustrates the inventive LLDPE (Component A)/LLDPE (Component B) blends disclosed herein. As shown, the inventive blends provide a higher hot tack peak force. The film extrusion machine temperature settings are shown in Table 10. The length of each Zone is equal to the length of the component (barrel, adaptor, and die) divided by the number of zones in the component.

TABLE 10

| | Zone | ° C. |
|---|---|---|
| Barrel | 1 | 180 |
| | 2 | 180 |
| | 3 | 180 |
| | 4 | 185 |
| Adaptor | 6 | 185 |
| | 7 | 185 |
| | 8 | 185 |
| | 9 | 190 |
| Die | 10 | 190 |
| | 11 | 190 |
| | 12 | 190 |

TABLE 11

| | Blend 1 | Blend 2 |
|---|---|---|
| Film Thickness (μm) | 20 | 20 |
| Elmendorf Tear (g, MD/TD) | 30/610 | 184/444 |
| Dart Impact (g/μm) | 159 | 928 |
| Melt Temperature (° C.) | 222 | 227 |
| Melt Pressure (Bar) | 470 | 461 |
| Motor Load (A) | 123 | 125 |

Legend for Table 11 and FIG. 1
Blend 1 EXCEED ™ 2018CA/LD150BW ™ blend (75:25 wt % ratio)
Blend 2 EXCEED ™ 2018CA/ENABLE ™ 20-05CH blend (75:25 wt % ratio)

TABLE 12

| | Blend 1 | Blend 2 | Blend 3 | Blend 4 | Blend 5 |
|---|---|---|---|---|---|
| Film Thickness (μm) | 50 | 50 | 50 | 50 | 50 |
| Elmendorf Tear (g, MD/TD) | 193/ 1577 | 521/ 928 | 618/ 1071 | 554/ 1068 | 473/ 1134 |
| Dart Impact (g/μm) | 327 | 1043 | 658 | 478 | 490 |
| Melt Temperature (° C.) | 222 | 227 | 227 | 228 | 220 |
| Melt Pressure (Bar) | 470 | 461 | 456 | 450 | 479 |
| Motor Load (A) | 123 | 125 | 124 | 123 | 127 |

Legend for Table 12 and FIG. 2
Blend 1 EXCEED ™ 2018CA/LD150BW blend (75:25 wt % ratio)
Blend 2 EXCEED ™ 2018CA/ENABLE ™ 20-05CH blend (75:25 wt % ratio)
Blend 3 EXCEED ™ 2018CA/ENABLE ™ 27-05CH blend (75:25 wt % ratio)
Blend 4 EXCEED ™ 2018CA/ENABLE ™ 35-05CH blend (75:25 wt % ratio)
Blend 5 EXCEED ™ 2018CA/ENABLE ™ 20-05CH/HTA108 blend (70:20:10 wt % ratio)

TABLE 13

| | Blend 1 | Blend 2 |
|---|---|---|
| Film Thickness (μm) | 100 | 100 |
| Elmendorf Tear (g, MD/TD) | 841/1883 | 1206/1827 |
| Dart Impact (g/μm) | 823 | 1662 |
| Melt Temperature (° C.) | 222 | 227 |
| Melt Pressure (Bar) | 470 | 461 |
| Motor Load (A) | 123 | 125 |

Legend for Table 13
Blend 1 EXCEED ™ 2018CA/LD150BW blend (75:25 wt % ratio)
Blend 2 EXCEED ™ 2018CA/ENABLE ™ 20-05CH blend (75:25 wt % ratio)

Example 4

Tables 15 illustrate various properties of single-layer films formed using: (1) conventional LLDPE/LDPE blends; and (2) a blend of Component A and Component B. As shown, the inventive blends provide a combination of better Elmendorf Tear, Dart Impact, and Puncture and comparable processability. The film extrusion machine temperature settings are shown in Table 14.

The films of Example 4 were made on an mono-layer blown film line made by China Guangdong Jinming Plastics Equipment Co., Ltd. with screw size: 65 mm, screw length: 30/1 L/D, die diameter: 250 mm, die gap: 1.8 mm, Blow Up Ratio (BUR): 2.5. The length of each Zone is equal to the length of the component (barrel, screen, and die) divided by the number of zones in the component.

TABLE 14

| | Zone | ° C. |
|---|---|---|
| Barrel | 1 | 165 |
| | 2 | 205 |
| | 3 | 185 |
| | 4 | 175 |
| Screen | 5 | 175 |
| Die | 6 | 185 |
| | 7 | 190 |
| | 8 | 200 |

TABLE 15

| | Blend 1 | Blend 2 | Blend 3 | Blend 4 | Blend 5 | Blend 6 |
|---|---|---|---|---|---|---|
| Film Thickness (μm) | 50 | 50 | 50 | 50 | 50 | 50 |
| Elmendorf Tear (g, MD/TD) | 122/612 | 92/403 | 372/668 | 362/724 | 551/841 | 444/776 |
| Dart Impact (g/μm) | 173 | 142 | 316 | 561 | 1138 | 1122 |
| Puncture (N) | 105 | 90 | 133 | 150 | 170 | 185 |
| Melt Temperature (° C.) | 200 | 192 | 200 | 197 | 187 | 197 |
| Melt Pressure (MPa) | 42 | 36 | 41 | 39 | 35 | 35 |
| Throughput (kg/h) | 120 | 120 | 84 | 90 | 84 | 84 |

Legend for Table 15
Blend 1 LL1001XV/LD150BW blend (60:40 wt % ratio)
Blend 2 LL1001XV/LD150BW blend (40:60 wt % ratio)
Blend 3 LL1001XV/ENABLE ™ 20-05CH blend (60:40 wt % ratio)
Blend 4 LL1001XV/ENABLE ™ 20-05CH blend (40:60 wt % ratio)
Blend 5 EXCEED ™ 2018CA/ENABLE ™ 20-05CH blend (60:40 wt % ratio)
Blend 6 EXCEED ™ 2018CA/ENABLE ™ 20-05CH blend (60:40 wt % ratio)

Example 5

Tables 17 illustrate various properties of single-layer films formed: (1) using conventional LLDPE (Component A)/LDPE blends; and (2) using a blend of Component A and Component B. Column 1 & 2 of Tables 17 illustrate conventional LLDPE (Component A)/LDPE blends. The remaining columns illustrate the inventive LLDPE (Component A)/LLDPE (Component B) blends disclosed herein. As shown, the inventive blends provide a combination of better Elmendorf Tear, Dart Impact, and comparable processability. The film extrusion machine temperature settings are shown in Table 16.

The films of Example 5 were made on an mono-layer blown film line made by China Guangdong Jinming Plastics Equipment Co., Ltd. with screw size: 65 mm, screw length: 30/1 L/D, die diameter: 250 mm, die gap: 1.8 mm, Blow Up Ratio (BUR): 2.5, throughput: 100 kg/hr. The length of each Zone is equal to the length of the component (barrel, screen, and die) divided by the number of zones in the component.

TABLE 16

| | Zone | ° C. |
|---|---|---|
| Barrel | 1 | 195 |
| | 2 | 225 |
| | 3 | 190 |
| | 4 | 170 |
| Screen | 5 | 195 |
| Die | 6 | 200 |
| | 7 | 210 |
| | 8 | 215 |

TABLE 17

| | Blend 1 | Blend 2 | Blend 3 | Blend 4 | Blend 5 | Blend 6 |
|---|---|---|---|---|---|---|
| Film Thickness (μm) | 25 | 25 | 25 | 25 | 25 | 25 |
| Elmendorf Tear (g, MD/TD) | 65/400 | 63/540 | 228/458 | 278/450 | 185/445 | 190/428 |
| Dart Impact (g/μm) | 115 | 145 | 640 | 1450 | 1250 | 160 |
| Melt Temperature (° C.) | 195 | 196 | 196 | 198 | 195 | 192 |
| Motor Power Consumption (KW) | 51 | 56 | 55 | 66 | 65 | 57 |

Legend for Table 17
Blend 1 LL1001XV/Z-N C8LLDPE/LD150BW blend (34:33:33 wt % ratio)
Blend 2 LL1001XV/EXCEED ™ 2018CA/LD150BW blend (34:33:33 wt % ratio)
Blend 3 EXCEED ™ 1018CA/ENABLE ™ 20-10CH blend (25:75 wt % ratio)
Blend 4 EXCEED ™ 1018CA/ENABLE ™ 20-10CH blend (75:25 wt % ratio)
Blend 5 EXCEED ™ 1018CA/ENABLE ™ 20-05CH blend (25:75 wt % ratio)
Blend 6 LL1001XV/ENABLE ™ 20-10CH blend (50:50 wt % ratio)

The embodiments and tables set forth herein are presented to best explain the present invention and its practical application and to thereby enable those skilled in the art to make and use the invention. However, those skilled in the art will recognize that the foregoing descriptions and tables have been presented for the purpose of illustration and example only. The description as set forth is not intended to be exhaustive or to limit the invention to the precise form disclosed. Many modifications and variations are possible in light of the teaching herein without departing from the spirit and scope of the claims.

We claim:

1. A polymer composition comprising:

(a) component A having: at least 50 wt % ethylene moieties and up to 50 wt % $C_3$ to $C_{20}$ comonomer moieties, the wt % s based upon the total weight of component A, and:
 i) a density of about 0.86 to about 0.965 g/cm$^3$;
 ii) a melt index (MI) of about 0.1 to about 10.0 g/10 min;
 iii) a branching index (g') of about 0.96 to about 1.0; and (b) component B having at least 65 wt % ethylene moieties and up to 35 wt % $C_3$ to $C_{20}$ comonomer moieties, the wt % s based upon the total weight of component B, and:
 i) a density of about 0.905 to about 0.945 g/cm$^3$;
 ii) a melt index (MI) of about 0.1 to about 10.0 g/10 min; and
 iii) a branching index (g') of about 0.7 to about 0.95.

2. The polymer composition of claim 1, wherein component A has a composition distribution breadth index of 10% to 75%.

3. The polymer composition of claim 1, wherein component B has a composition distribution breadth index of greater than 75%.

4. The polymer composition of claim 1, wherein component A is formed in the presence of a Ziegler-Natta catalyst.

5. The polymer composition of claim 1, wherein component A is formed in the presence of a metallocene catalyst.

6. The polymer composition of claim 1, wherein the comonomer moieties in Component A comprise one or more of butene, hexene and octene.

7. The polymer composition of claim 1, wherein the comonomer moieties in Component B comprise one or more of butene, hexene and octene.

8. The polymer composition of claim 1, wherein component B is formed in the presence of a metallocene catalyst.

9. The polymer composition of claim 1, wherein the $C_3$ to $C_{20}$ comonomer moieties in Component A is present in an amount of about 1.0 to about 20.0 wt %, based upon total weight of Component A.

10. The polymer composition of claim 1, wherein the $C_3$ to $C_{20}$ comonomer moieties in Component B is present in an amount of about 1.0 to about 20.0 wt %, based upon total weight of Component B.

11. The polymer composition of claim 1, wherein Component A has a density of about 0.905 to about 0.940 g/cm$^3$.

12. The polymer composition of claim 1, wherein Component B has a density of about 0.915 to about 0.940 g/cm$^3$.

13. The polymer composition of claim 1, wherein the polymer composition comprises 1-99 wt % of Component A and 99-1 wt % of Component B, based upon total weight of the polymer composition.

14. The polymer composition of claim 1, wherein Component A has a Melt Index Ratio of 10 to 30, and Component B has a Melt Index Ratio of greater than 30 to 100.

15. A film having a thickness of greater than about 20 μm, the film comprising a polymer composition having:

(a) about 75 wt % of Component A based upon the total weight of the polymer composition, Component A having at least 50 wt % ethylene moieties and up to 50 wt % $C_3$ to $C_{20}$ comonomer moieties based upon the total weight of Component A, and:
 i) a density of about 0.86 to about 0.965 g/cm$^3$;
 ii) a melt index (MI) of about 0.1 to about 10.0 g/10 min; and
 iii) a branching index (g') of about 0.96 to about 1.0; and (b) about 25 wt % of Component B, the wt % based upon total weight of the polymer composition, Component B having at least 65 wt % ethylene moieties and up to 35 wt % $C_3$ to $C_{20}$ comonomer moieties, the wt % s based upon the total weight of Component B, and:
 i) a density of about 0.905 to about 0.945 g/cm$^3$;
 ii) a melt index (MI) of about 0.1 to about 10.0 g/10 min; and
 iii) a branching index (g') of about 0.7 to about 0.95.

16. The film of claim 15, wherein the film has an Elmendorf Tear of greater than about 20 g in the machine direction.

17. The film of claim 15, wherein the film has a dart impact of greater than about 50 g/μm.

18. The film of claim 15, wherein the film has a puncture force at break of greater than about 30 N.

19. The film of claim 15, wherein the film has a hot tack peak force of greater than about 5 N/30 mm.

* * * * *